A. D. WATERS.
GREASE CUP AND METHOD OF MAKING SAME.
APPLICATION FILED MAR. 10, 1920.

1,411,821. Patented Apr. 4, 1922.

Inventor
Archiebald D. Waters
H. Start
His Attorney

UNITED STATES PATENT OFFICE.

ARCHIEBALD D. WATERS, OF NEW BRITAIN, CONNECTICUT, ASSIGNOR TO THE STANLEY WORKS, OF NEW BRITAIN, CONNECTICUT, A CORPORATION OF CONNECTICUT.

GREASE CUP AND METHOD OF MAKING SAME.

1,411,821. Specification of Letters Patent. Patented Apr. 4, 1922.

Application filed March 10, 1920. Serial No. 364,758.

*To all whom it may concern:*

Be it known that I, ARCHIEBALD D. WATERS, a citizen of the United States, and resident of New Britain, county of Hartford, State of Connecticut, have invented certain new and useful Improvements in a Grease Cup and Method of Making Same, of which the following is a specification.

It is the object of the present invention to provide a grease cup having features of novelty and advantage, and particularly to provide a device of this sort which is simple in construction and, therefore, may be manufactured at a low cost and which is efficient in operation in that leakage of the grease contained therein is effectively guarded against.

In the accompanying drawing, wherein the preferred embodiment of the invention is illustrated, Fig. 1 is a vertical sectional view taken centrally through a grease cup constructed in accordance with the present invention.

Figure 1:
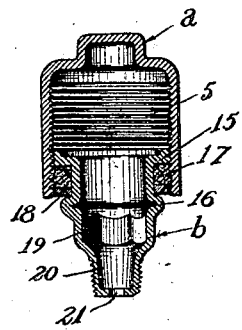

Referring to the drawing in detail, $a$ is the cap of the grease cup and $b$ is the base portion thereof. The cap $a$, the specific construction of which may be varied, but which is preferably given the shape shown by a series of drawing operations, is generally of cylindrical form and internally threaded as at 5. The present invention relates particularly to the base member $b$.

The base member $b$, preferably formed from a single piece of sheet metal, has a head 15 at its open end externally threaded so as to be screwed into the cap $a$, an annular fold or rib 16 between which and the head 15 a packing washer or gasket 17 and a metallic washer 18 are positioned; a polygonal portion 19 adapted to receive a wrench and a threaded nipple 20 at its outer end adapted to be screwed into the threaded opening of the bearing to be lubricated. The end wall of this nipple has an orifice 21 through which the grease is discharged.

Figure 2:
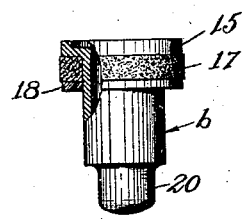
Figs. 2 and 3 are views, partly in section, of the base of the grease cup in the process of manufacture.
Figure 3:
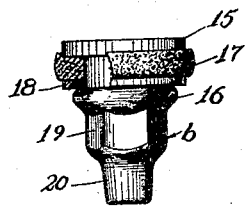

The base $b$ is preferably formed from a single sheet of metal by a series of drawing operations and while the process of manufacture employed may be varied, the preferred method is as follows. A circular disk is stamped from a sheet of metal and then by a series of drawing operations given the shape shown in Fig. 2, wherein the partially formed base is shown as being generally of cylindrical form with a head 15 at its open end and a portion of reduced diameter at its closed end. The gasket 17 of fibre, leather or the like and the metallic washer 18 are then positioned on the base as shown in Fig. 2. The cylindrical portion of the base is then fore-shortened or swaged to form an annular fold or rib 16, this rib being so located that in the course of its production the metallic washer 18 will be forced under considerable pressure towards the head 15, thereby compressing the interposed gasket 17 causing the head thereof to be squashed or squeezed out beyond the peripheral edges of the metallic washer 18 and the head as shown in Fig. 3.

Figure 4:
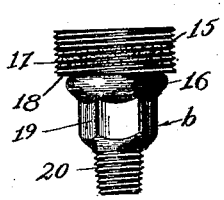
Fig. 4 is a side elevation of the completed base of the grease cup.

During the operation of swaging out the fold 16, the polygonal portion 19 may be formed, or if desired, this portion may be shaped in a subsequent operation. The peripheral edges of the head 15 and the gasket 17 and the metallic washer 18 are then threaded, as shown in Fig. 4, so that the threads of each of these members will be in threaded engagement with the thread 5 of the cap $a$ when the base is screwed into this cap.

It will be seen that with the construction described, the walls of the completed base are unbroken from end to end, thus eliminating all cracks or joints through which the grease might leak. Since the gasket 17 is positioned between the head 15 and the washer 18 and since the metallic washer 18 is in threaded engagement with the cap $a$, the washer is enclosed so that it cannot change its shape or become distorted by the pressure exerted thereagainst by the grease when the grease is compressed in the cup by screwing the cap down on the base. This means that the gasket will permanently retain its efficiency as a packing.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

What I claim is:—

1. In a grease cup, a base member formed from a single piece of sheet metal having a stem and a head at one end of said stem, a gasket about said stem and abutting said head, and a washer abutting said gasket and spaced thereby from said head, said stem having an annular fold securing said washer under pressure against said gasket.

2. In a grease cup, a base member having a stem and a head thereon, a compressible gasket against said head, a metallic washer against said gasket, means for securing said gasket and washer in position on said stem, and a thread formed on the peripheral edges of said head, gasket and washer.

3. In a grease cup, a base member formed from a single piece of sheet metal having a head at one end, a metallic washer thereon, a compressible gasket between said head and washer, said base member having an annular fold formed by swaging its side walls and compressing said gasket between said head and washer.

4. In a grease cup, a base member formed from a single piece of sheet metal having a head at one end and an annular fold in its side walls, a gasket and a metallic washer between said head and fold, and a thread formed on the peripheral edges of said head, gasket and washer.

5. The method herein described which consists in drawing a circular disk into the form of a thimble having a head at its open end, positioning a gasket and a metallic washer over the thimble and against the head, then swaging the thimble to form an annular fold overlying the washer and thereby compressing the gasket between the head and metallic ring, and then uniformly threading the peripheral edges of the head, gasket and ring.

ARCHIEBALD D. WATERS.